United States Patent [19]

Knorr

[11] Patent Number: 5,245,811
[45] Date of Patent: Sep. 21, 1993

[54] WALL FRAMING CLIP SYSTEM

[75] Inventor: William L. Knorr, P.O. Box 5267, Salem, Oreg. 97304

[73] Assignee: William L. Knorr, Salem, Oreg.

[21] Appl. No.: 669,677

[22] Filed: Mar. 14, 1991

[51] Int. Cl.$^5$ .............................................. E06B 3/54
[52] U.S. Cl. ....................................... 52/481; 52/243; 52/238.1; 403/382
[58] Field of Search ...................... 52/238.1, 241, 357, 52/359, 481, 243; 403/403, 382, 205, 387

[56] References Cited

U.S. PATENT DOCUMENTS

| | | |
|---|---|---|
| B1 4,353,192 | 9/1988 | Pearson et al. |
| 1,940,933 | 12/1933 | Balduf |
| 2,668,342 | 2/1954 | Nelsson ........................ 52/357 |
| 3,238,685 | 3/1966 | Emory |
| 3,271,920 | 9/1966 | Downing, Jr. ................. 52/481 |
| 3,312,030 | 4/1967 | Gillespie ........................ 52/359 |
| 3,445,975 | 5/1969 | Nelsson ........................ 52/359 |
| 3,553,915 | 1/1971 | Passovoy |
| 3,711,137 | 1/1973 | Tinnerman .................... 52/359 |
| 3,740,912 | 6/1973 | Sauer et al. |
| 3,839,839 | 10/1974 | Tillisch et al. ................. 52/481 |
| 3,921,346 | 11/1975 | Sauer et al. |
| 4,047,355 | 9/1977 | Knorr |
| 4,152,878 | 5/1979 | Balinski |
| 4,408,427 | 10/1983 | Zilch |
| 4,435,936 | 3/1984 | Rutkowski .................... 52/481 |
| 4,566,241 | 1/1986 | Schneller ...................... 52/481 |
| 4,578,922 | 4/1986 | Wendt |
| 4,596,094 | 6/1986 | Teller et al. ................... 52/357 |
| 4,616,461 | 10/1986 | Wendt ........................... 52/481 |
| 4,649,689 | 3/1987 | Everman et al. |
| 4,796,396 | 1/1989 | Menchetti ...................... 52/481 |

Primary Examiner—Peter M. Cuomo
Assistant Examiner—Michael J. Milano
Attorney, Agent, or Firm—Klarquist, Sparkman, Campbell, Leigh & Whinston

[57] ABSTRACT

An elongate unitary wall framing clip and a wall spacing assembly comprising the clip in combination with a stud member are provided for forming a multilayer wall assembly. The multilayer wall assembly includes a base layer comprising plural backing panels and a secondary layer comprising plural secondary panels, with the base and secondary layers being spaced apart by plural stud members. The clip includes an elongate web portion having proximate and distal edges and first and second side surfaces. An elongate full flange portion joins the web distal edge and extends beyond each of the web first and second side surfaces. An elongate half flange portion joins the web proximate edge and extends beyond the first side surface of the web. A first channel for receiving an edge of a first backing panel of the base layer is formed by the cooperation of the web portion first side surface and the half and full portions extending therebeyond. The clip also includes a lip engaging portion joining the half flange for gripping a lip of a stud member. The stud member cooperates with the web second side surface and the portion of the full flange extending therebeyond to form a second channel for receiving an edge of a second backing panel of the base layer. Such a multilayer wall assembly is also provided, along with a method of constructing such a wall assembly.

24 Claims, 2 Drawing Sheets

WALL FRAMING CLIP SYSTEM

BACKGROUND OF THE INVENTION

The present invention relates generally to a wall framing system for use in assembling multilayer walls having a base layer separated from a secondary layer, and more particularly to an improved wall framing clip, such as may be used to assemble a curtain wall on a building exterior, an area separation wall, or a shaftwall for stairwells, elevator shafts and the like.

Other multilayer wall constructions are known, for example, in U.S. Pat. No. 4,152,878 to Balinski, U.S. Pat. No. 4,408,427 to Zilch, and the U.S. Pat. No. B1-4,353,192 to Pearson, et al., each of which discloses an elongate stud positioned between two layers of gypsum wallboard. Each stud includes an integrally formed wallboard holding portion which serves to retain the wallboard against one face of the stud. The wallboard holding portion defines a pair of opposed channels so that the stud can be positioned at the vertical seam of two adjacent wallboard panels and retain the edges of the panels within the channels. One or more additional layers of the wallboard are fastened, typically by screws, to the opposite face of the stud, thereby creating an air space between the wallboard layers.

Another single piece framing stud for forming fire retardant shaftwalls is disclosed in U.S. Pat. Nos. 3,740,912 and 3,921,346 both to Sauer et al. The Sauer et al. stud requires separate nails or screws to secure both the inner and outer wall panels to the stud.

U.S. Pat. No. 3,553,915 to Passovoy discloses a clip system comprising an elongate multiple piece clip which is removably attached to a C-shaped stud to hold the vertical edges of a pair of adjacent wall panels against the stud. The Passovoy clip is used to assemble wall panels to form area separation or partition walls. The Passovoy clip includes a first snap-on clip member having a hook portion which clips onto the stud. The Passovoy clip further includes a second head member which is matingly received by the clip member so as to define a pair of elongate channels for snugly receiving the vertical edges of the wall panels therein. The Passovoy system apparently requires access to each side of the wall to install the two-piece clips.

U.S. Pat. No. 4,649,689 to Everman et al. discloses a multiple piece clip which is removably attached to a stud for assembling insulation board for roofs. The Everman system requires multiple separate fasteners which clip along the length of a single stud. Each fastener has a bifurcated shank portion which may protrude through the insulation board to engage a support washer installed on the opposite side of the insulation board. The Everman system appears to require access to both sides of the wall to install the washer on one side and the clip on the other.

Another wall framing clip system is disclosed in U.S. Pat. No. 4,578,922 to Wendt. The Wendt system uses a plurality of bent wire clips having sharp impaling ends which are embedded into the side edges of wallboard panels. The wire clips also have a bent spring-tensioned stud receiving portion which clip onto the stud to hold the wallboard in place. A plurality of the wire clips are required along the length of the stud. The Wendt system is viewed as a structurally weaker system, because the wire clips structurally damage the wallboard upon assembly. Furthermore, the Wendt clips grip only a portion of the wallboard thickness to secure the wallboard to the stud, as opposed to gripping the entire thickness of the wallboard.

Other clip systems include the multiple clip system disclosed in U.S. Pat. No. 1,940,933 to Balduf. U.S. Pat. No. 3,238,685 to Emroy discloses a single piece window retaining clip for retaining a window within a metal window frame.

These other wall construction systems suffer from various disadvantages. For example, many require multiple clips to engage each stud used to construct the wall, with each clip requiring extensive labor to be installed. Some of these systems require access to both sides of the wall being constructed, which is undesirable for constructing shaftwalls or exterior curtain walls for buildings without scaffolding. Other one piece systems are disadvantageous because they do not allow flexibility in interchanging the stud size, to accommodate varying interwall spacings as required by various building codes and applications. Also, such one piece systems require the wall retaining portion to be made out of the same heavy gauge of metal as the load bearing stud portion which is subject to a much greater load. Some of the known clip systems leave the edges of two adjoining panels exposed to damage. Others engage the wall panels at isolated spaced apart locations and are inherently weaker in providing structural support for a secondary wall layer supported by the stud to which the clips are attached.

Thus, a need exists for an improved wall framing system for constructing multilayer walls comprising base and secondary layers, such as may be used to form a building exterior curtain wall, an area separation wall, or a shaftwall for a stairwell or an elevator shaft, which is not susceptible to the above limitations and disadvantages.

SUMMARY OF THE INVENTION

It is an overall object of the present invention to provide an improved wall framing clip system for constructing multilayer walls having spaced apart base and secondary layers.

A further object of the present invention is to provide an improved wall framing clip system which speeds the assembly of such multilayer walls and permits the multilayer wall to be constructed from one side.

An additional object of the present invention is to provide an improved wall framing clip system which may be used to construct multilayer walls having greater strength and structural integrity than existing known systems.

A further object of the present invention is to provide an improved wall framing clip system which allows multilayer walls to be readily constructed from a single side.

Another object of the present invention is to provide an improved wall framing clip which may be manufactured from a single piece of sheet material.

Still another object of the present invention is to provide an improved wall framing clip which is economical to manufacture and provides great structural integrity when combined with a stud to construct a multilayer wall.

Yet another object of the present invention is to provide an improved wall framing clip which protects and shelters the edges of the wall panels assembled therewith from damage.

A further object of the present invention is to provide an improved wall framing clip system having a wall framing clip which may be used with commonly available studs of varying widths to form a variety of multilayer walls each having a different interwall spacing as required by the particular wall application.

Another object of the present invention is to provide an improved wall framing clip system which may be used with commonly available studs constructed of different gauges of metal.

Yet another object of the present invention is to provide an improved wall framing clip which snugly engages the wall panels with which the clip is assembled.

A further object of the present invention is to provide an improved wall spacing assembly for constructing a multilayer wall having a base layer and a secondary layer separated by the wall spacing assembly.

Another object of the present invention is to provide an improved wall framing system for constructing an exterior building curtain wall or an interior building wall, both of which may extend vertically for many floors.

An additional object of the present invention is to provide an improved wall framing clip system for use in constructing load-bearing partition walls, such as inside a residential dwelling.

Still another object of the present invention is to provide an improved wall framing clip system for constructing a multilayer wall assembly which may flex when subjected to changing pressure, such as the pressure changes caused by the movement of an elevator within an elevator shaft surrounded by such a wall or experienced during minor earthquake tremors.

A further object of the present invention is to provide an improved wall framing clip system which may be used to construct multilayer walls having one layer assembled from heavy panels, such as marble panels.

Another object of the present invention is to provide an improved wall framing clip system for constructing multilayer walls having an improved sound attenuating capability through the multilayer wall.

Yet another object of the present invention is to provide an improved wall framing clip system for constructing multilayer walls having reduced thermal conductivity through the wall.

A further object of the present invention is to provide an improved shaftwall which may be assembled from the exterior of a shaft without requiring scaffolding access to the shaft interior.

An additional object of the present invention is to provide a multilayer wall assembly having base and secondary layers either or both of which are suitable as an outer face layer exposed to view.

A further object of the present invention is to provide an improved wall framing clip system for constructing an exterior wall on a building from the interior structure of the building, without requiring scaffolding along the building exterior.

Yet another object of the present invention is to provide an improved wall framing clip system having wall framing clips which may be preassembled along a side edge of a wall panel for shipment to a building site.

According to one aspect of the present invention, an elongate unitary wall framing clip is provided for forming a multilayer wall. The multilayer wall has a base layer comprising plural adjacent backing panels and a secondary layer comprising plural adjacent secondary panels. The base and secondary layers are spaced apart by plural stud members, with each stud member having opposing base and secondary layer engaging portions and a web extending therebetween. A lip portion extending from the base layer engaging portion projects generally toward the secondary layer. The wall framing clip has an elongate web portion with proximate and distal edges and first and second side surfaces. The clip also has an elongate full flange portion joining the web portion distal edge and extending beyond each of the first and second side surfaces of the web portion. The clip includes an elongate half flange portion joining the web portion proximate edge and extending beyond the first side surface of the web portion. This first side surface cooperates with the half and full flange portions extending therebeyond to form a first channel for receiving an edge of a first backing panel. The clip also includes a lip engaging portion joining the half flange portion to grip the lip of the stud member. The second side surface cooperates with the full flange portion and the stud member to form a second channel for receiving an edge of a second backing panel.

In an illustrated embodiment, the wall framing clip described above is formed from a single sheet of material with multiple folds forming the web portion and the half and full flange portions. The full flange portion has a partial double layer formed by the single sheet of material being folded over on itself. In one embodiment, the lip engaging portion comprises a plurality of cut-out sections on the half flange portion, with each cut-out section bent outwardly with respect to the web portion to terminate at a crimped edge. In another alternate embodiment, the clip comprises a continuous lip engaging portion formed by bending the half flange portion into a crimped edge. In yet another alternate embodiment, the clip comprises an integral extrusion of, for example, an aluminum alloy or a plastic.

According to another aspect of the present invention, a method is provided of constructing a multilayer wall assembly having a base layer spaced apart from a secondary layer. The method includes the step of providing a plurality of backing panels, a plurality of secondary panels, and a plurality of stud members. Each stud member has a spacing portion terminating at opposing edges with base and secondary layer engaging portions, with the base layer engaging portion having a lip projecting therefrom generally toward the secondary layer engaging portion. The method further includes the step of providing a wall framing clip which may be as described above. In a first assembling step, the base layer is assembled by inserting an edge of a first backing panel into the first channel of a clip, and inserting an edge of a second backing panel into at least a portion of the second channel of said clip. In an engaging step, the clip lip engaging portion is engaged with a stud member lip. After assembling at least a portion of the base layer, in a next assembling step, the secondary layer is assembled by attaching first and second adjacent secondary panels to the secondary layer engaging portion of said stud member. In further steps, the first assembling step is repeated until the base layer is completed, and said next assembling step is repeated until the secondary layer is completed.

According to a further aspect of the invention, a fire resistant shaftwall is provided for use in a vertical shaft. The shaftwall includes a base layer comprising plural gypsum backing panels each having a side edge. The base layer also includes at least one elongate unitary wall framing clip means as described above for connecting to adjacent gypsum backing panels. The clip means is also provided for engaging a stud. The shaftwall also includes plural studs, with each stud engaged by one of the clip means to project from the base layer. The shaftwall also has a secondary layer comprising plural gypsum secondary panels. Two adjacent gypsum secondary panels are attached to a projecting stud with the stud spacing apart the base and secondary layers. In this manner, the shaftwall may be assembled solely from the secondary layer side of the shaftwall exterior to the vertical shaft by first assembling the base layer.

According to yet another aspect of the present invention, a wall spacing assembly is provided for spacing apart a base layer and a secondary layer in a multilayer wall assembly. The wall spacing assembly comprises a stud member having a projecting lip and an elongate unitary wall framing clip having a lip engaging portion which detachably grips the stud member lip. In an illustrated embodiment, the stud member comprises a C-shaped stud and the clip is formed from a single sheet of material having multiple folds.

The present invention relates to the above features and objects individually as well as collectively. These and other objects, features and advantages of the present invention will become apparent to those skilled in the art from the following description and drawings.

DETAILED DESCRIPTION OF THE PREFERRED EMBODIMENTS

Figure 3:
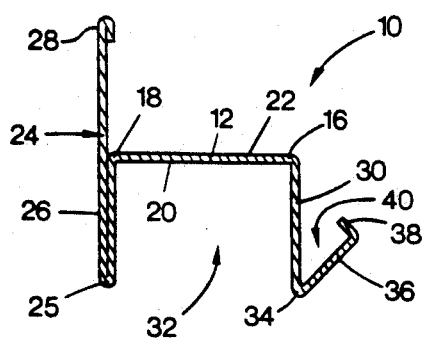
FIG. 3 is a horizontal sectional view taken along lines 3—3 of FIG. 2.
Figure 1:
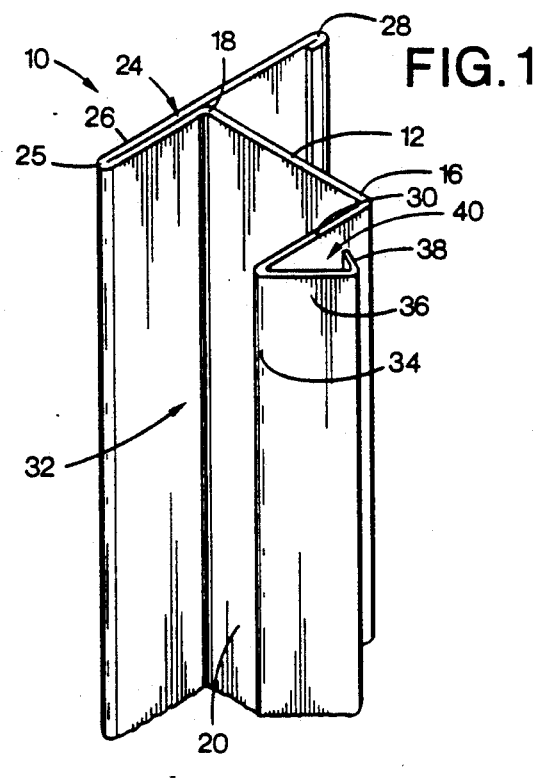
FIG. 1 is a perspective view of a portion of one form of a wall framing clip of the present invention.
Figure 2:
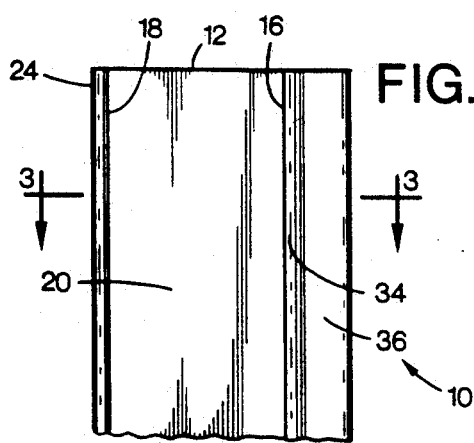
FIG. 2 is a side elevational view of the clip of FIG. 1.

FIGS. 1-3 illustrate a first embodiment of a fastener or clip means, such as an elongate unitary wall framing fastener or clip 10, constructed in accordance with the present invention. The clip 10 includes an elongate central web portion or web 12 having proximate and distal edges 16, 18. The web 12 also has first and second side surfaces 20, 22 (see FIG. 3).

The clip 10 also has a first flange portion comprising an elongate full flange portion or full flange 24 integrally connected with the web 12. The full flange 24 joins the distal edge 18 and extends substantially perpendicularly from the web 12 in both directions beyond each of the first and second side surfaces 20, 22. The clip may be formed by placing multiple folds in a single sheet of material, preferably steel. The full flange 24 is folded over on itself at bend 25 to form a first double layer portion 26. The full flange 24 also has a second double layer portion 28 opposite bend 25, which again is formed by folding over the single sheet of material on itself.

The web portion 12 also is integrally connected with a second flange portion, such as an elongate half flange portion or half flange 30. The half flange 30 joins the proximate edge 16 and extends substantially perpendicularly from the web 12 beyond first side surface 20. In this manner, first side surface 20 cooperates with the half flange 30 and the full flange double layer portion 26 to form a first elongate channel, trough or pocket 32. The half flange 30 terminates at a distal edge 34. Sheet metal which may form clip 10 is bent at edge 34 to extend partially backwardly and outwardly relative to the second flange portion 30 so as to define an acute angle therebetween and to form a lip engaging portion or hook member 36. The hook member 36 terminates with an elongate crimped or bent edge portion or hook 38. The half flange 30 and the hook member 36 cooperate to define an elongate stud engaging cavity 40. Thus, the clip 10 overall has a substantially J-shaped configuration.

In the illustrated embodiment of FIGS. 1-5, the clip 10 is formed from a single sheet of material, such as twenty-five through sixteen gauge ASTM A446 Grade A galvanized sheet steel. This material advantageously provides a clip having resilient properties and galvanization aids in preventing oxidation of the clip during storage and final use.

Figure 4:
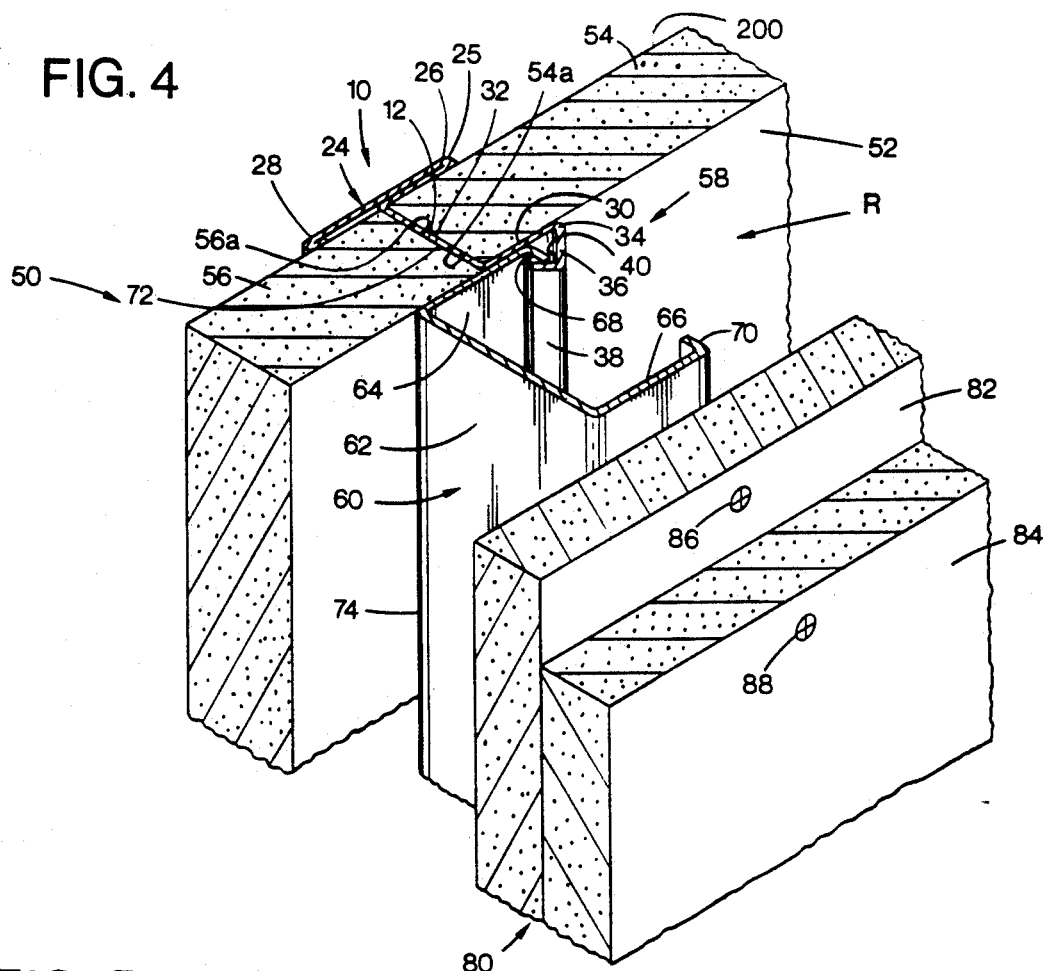
FIG. 4 is a perspective view of one form of a multilayer wall assembly of the present invention, shown assembled using the wall framing clip of FIG. 1.
Figure 5:
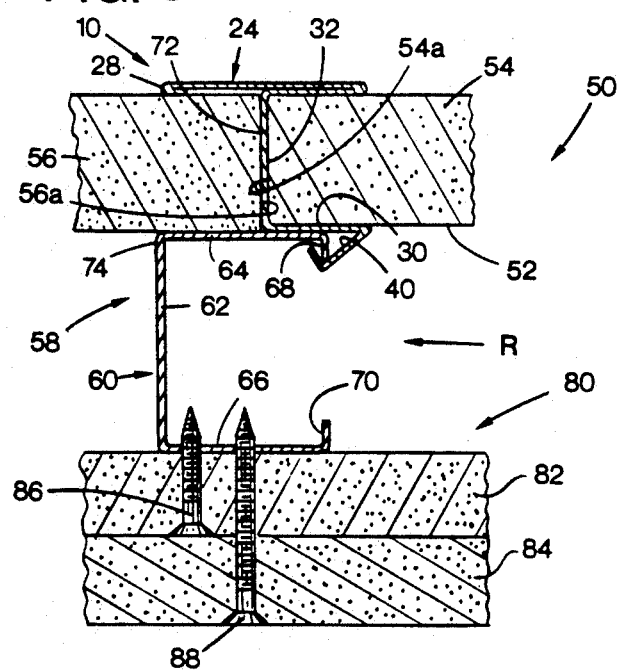
FIG. 5 is a horizontal sectional view of the multilayer wall assembly of FIG. 4.

Referring to FIGS. 4 and 5, a multilayer unsymmetrical or unbalanced wall assembly or wall 50 is illustrated to show clip 10 in use. The multilayer wall 50 includes an inner base layer 52 comprising first and second backing panels, such as gypsum or sheetrock wall panels or wallboard 54 and 56. The backing panel 54 has a vertical edge 54a which is received by the first channel 32. The bent edges 25 and 34 of the respective full and half flanges 24, 30 advantageously provide a smooth entrance for receiving the backing panel edge 54a upon assembly of the base layer 52. This advantageously minimizes damage to panel 54 adjacent edge 54a during wall assembly.

A wall spacing assembly 58 is provided by the combination of clip 10 and a stud member or stud 60. The stud 60 includes a spacing portion or web portion or spacer 62 terminating at opposing edges with a base layer engaging portion 64 and a secondary layer engaging portion 66. The stud base layer engaging portion 64 terminates at a crimped lip portion 68 which projects generally toward the secondary layer engaging portion 66. In the illustrated embodiment, the stud 60 is a symmetrical C-shaped stud or C-stud having portion 66 also terminating at a crimped lip portion 70 which projects generally toward the opposing wall engaging portion 64. Therefore, it is apparent that stud 60 may be inverted such that lip 70 is received by the stud engaging cavity 40.

To assemble the wall spacing assembly 58, the stud engaging cavity 40 receives the stud lip 68 and the hook member 38 of clip 10 grips lip 68. The spacing assembly 58 may be designed such that the clip hook member 38 resiliently grips lip 68 so the assembly 58 may be snapped together. When assembled, the web second side surface 22 and the portion of the full flange 24 extending beyond side surface 22 each cooperate with the stud base layer engaging portion 64 to form and define a second backing panel receiving channel, trough or pocket 72. The clip second channel 72 (see FIGS. 4 and 5) receives an edge 56a of the backing panel 56. The double layered portion 28 of the full flange 24 together with a rounded corner 74 joining stud portions 62 and 64 provide a smooth entrance for edge 56a of the backing panel 56. This advantageously minimizes damage to panel 56 adjacent edge 56a during wall assembly.

The multilayer wall 50 also includes an outer secondary layer 80, illustrated as a double layer having first inner and second outer wall panels, such as drywall panels or gypsum wallboards 82, 84. Screws 86 and 88 attach the respective inner and outer wall panels 82 and 84 to the stud secondary layer engaging portion 66. Preferably, screws 86 and 88 are self-tapping screws, to advantageously expedite assembly of the multilayer wall 50. Other means of securing the secondary panels to the stud members are known in the art, and may vary according to the sizing and type of materials from which the panels and stud members are formed.

A method of constructing a multilayer wall assembly, such as the unsymmetrical multilayer wall 50, is illustrated with reference to FIGS. 4 and 5. The method includes the steps of providing a plurality of: backing panels 54, 56; secondary panels 82, 84; stud members 60; and wall framing clips 10. Other conventional framing members which are known in the art may also be provided. For example, J-tracks (not shown), which are horizontal framing members, are provided at the top and bottom of a vertical wall section to receive therein the respective top and bottom edges of multilayer wall 50. The J-tracks may be joined together in a back-to-back relationship to stack the vertical wall sections on top of one another to construct a multilayer wall spanning multiple floors.

With the materials thusly provided, the base layer 52 is first assembled by inserting edge 54a of panel 54 into the first channel 32 of clip 10. Edge 56a of panel 56 is inserted into the second channel 72 formed by the cooperation of clip 10 and stud 60. Note that the stud lip 68 and clip hook member 36 may be engaged or snapped together prior to assembly of the base layer 52. Alternatively, stud 60 may be received by the clip hook member 36 during or after assembly of the base layer 52. For example, the clip 10 may first receive panel 54, followed by engagement of the stud 60 and clip 10, and finally, wall panel 56 is installed. By repeating this first assembling step, it is apparent that subsequent wall panels and clips may be installed to extend the length of the base layer 52.

After assembling at least a portion of the base layer 52, the secondary layer 80 is assembled by first attaching wall panel 82 to the stud 60 in a conventional manner, such as using screws like self-tapping screw 86. A symmetrical multilayer wall (not shown) may be formed with base layer 52 as shown and a secondary layer 80 comprising a single layer of secondary panels, such as wallboards 82. The unsymmetrical multilayer wall 50 is formed by installing a second layer of wall panels 84 over wall panels 82 in a conventional manner, such as using screws like self-tapping screw 88. Preferably, the screws 88 extend through both secondary panels 82, 84 to engage portion 66 of stud 60. It is apparent that this manner of assembling the secondary layer 80 may be repeated until the secondary layer is complete.

Figure 6:
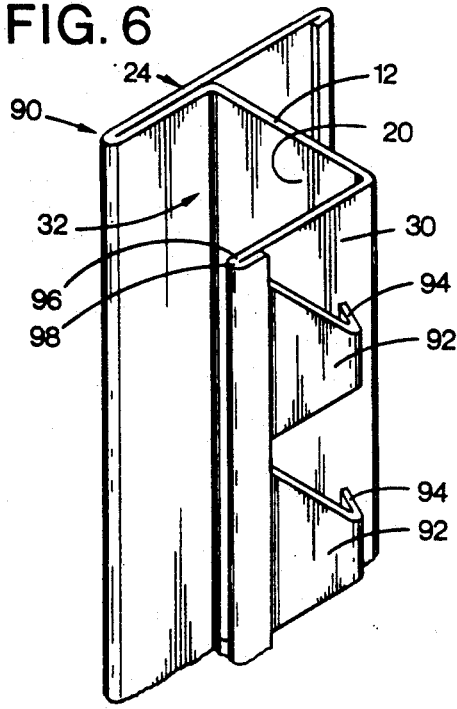
FIG. 6 is a perspective view of one form of an alternate wall framing clip of the present invention.

FIG. 6 illustrates a second embodiment of an elongate unitary wall framing clip 90 having web portion 12, full flange 24 and half flange 30 as described above for clip 10. Clip 90 illustrates an alternate lip engaging hook portion comprising a plurality of spaced tapered, trapezoidal shaped lip engaging portions or hook members 92 each terminating with a crimped edge or hook 94 for engaging the stud lip 68. Clip 90 preferably is formed from a single sheet of material, with the half flange 30 having a double layer portion 96 formed by folding the sheet material over on itself at bend 98. Each of the hook members 92 extend at least partially over and outwardly from the half flange portion 30. The plural hook members 92 engage the stud lip 68 (not shown) to provide a wall spacing assembly substantially equivalent in performance to assembly 58.

Figure 7:
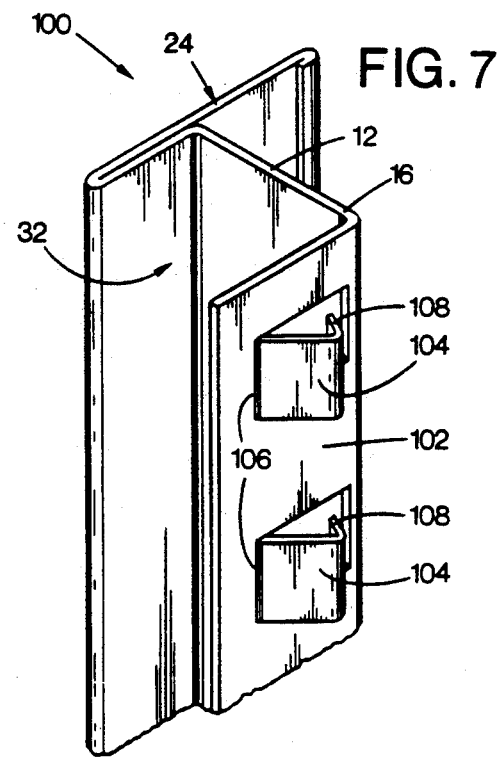
FIG. 7 is a perspective view of one form of another alternate wall framing clip of the present invention.

FIG. 7 illustrates a third embodiment of an elongate unitary wall framing clip 100 having a web 12 and a full flange 24 as shown for clip 10. Clip 100 has a modified half flange 102 joined to the proximate edge 16 of web 12. The half flange 102 has a plurality of cut-out sections each comprising a lip engaging portion or hook member 104. Each cut-out hook member 104 is bent outwardly from the half flange along a bend 106 and terminates with a crimped edge or hook 108. The plural hook members 104 engage the stud lip 68 (not shown) to provide a wall spacing assembly substantially equivalent in performance to assembly 58.

Figure 8:
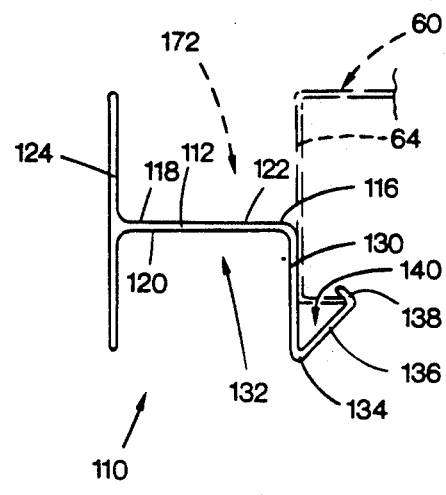
FIG. 8 is an end view of another form of an alternate embodiment of a wall framing clip of the present invention.

FIG. 8 illustrates a fourth embodiment of the present invention, an elongate unitary wall framing clip 110 comprising an extruded clip which may be of an aluminum alloy formed through an extrusion dye. In certain applications, such as portable multilayer wall units, the extruded clip 110 may be of a suitable plastic to provide a lightweight wall assembly. Furthermore, plastic extruded clips 110 may advantageously have varying colors chosen in conjunction with the color selection for backing panels 54, 56.

For clarity in numbering of the components, similar components on the extruded clip 110 and the single folded steel sheet clip 10 differ in item numbers by one hundred. Clip 110 includes a web portion or web 112 having opposing proximate and distal edges 116, 118 and opposing first and second side surfaces 120, 122. The clip 110 has a first full flange portion or full flange 124 joined to the web distal edge 118. The full flange 124 extends beyond the web first and second side surfaces 120, 122. A half flange portion or half flange 130 joins the web proximate edge 116 and extends beyond the web first side surface 120. The web first side surface 120 cooperates with the half flange 130 and the portion of the full flange 124 which extends beyond side surface 120 to form a first channel, trough or pocket 132. The half flange 130 terminates at a distal edge 34 to which is joined a lip engaging portion or hook member 136 terminating with a hook 138. The half flange 130 and the hook member 136 cooperate to define an elongate stud engaging cavity 140.

Clip 110 may be assembled with stud 60 as described for clip 10, to provide a wall spacing assembly substantially equivalent in performance to assembly 58. Clip 110 engages stud lip 68 to form a second channel, pocket or trough 172 by cooperation of the web second side surface 122, the portion of the full flange 124 extending beyond side surface 122, and the stud base layer engaging portion 64.

Additionally, the hook member 36 of the first embodiment (see FIGS. 1–5), the plural hook members 92 of the second embodiment (FIG. 6), the plural hook members 104 of the third embodiment (FIG. 7), and/or the hook member 136 of the fourth embodiment (FIG. 8) may be resilient in nature to slightly deform upon initial engagement with lip 68. The resilient nature of the hook portion secures the stud 60 in place to aid in maintaining the integrity of the wall spacing assembly, such as assembly 58, and to advantageously facilitate assembly of the multilayer wall 50.

In this manner, a multilayer wall 50 may be easily constructed by a hanger from a single side by first assembling the base layer 52, installing stud member 60, then joining the secondary layer 80 with stud 60. This manner of constructing a multilayer wall is particularly advantageous, for example, when constructing a shaftwall, such as used to enclose vertical shafts like elevator shafts, stairwells and chases, when constructing an exposed exterior surface of a building, and when constructing an interior atrium wall within a building. Advantageously, the clip and method of the present invention allow construction of such shaftwalls and building walls from the existing floors of the building without requiring scaffolding. This provides for significant labor savings in assembling such multilayer walls and eliminates work hazards associated with hangers working on scaffolding. Additional construction labor savings may be realized by assembling the clips 10, 90, 100 or 110 to the backing panel edge 54a prior to shipment to the construction site.

For vertical shafts walls, building exterior walls and interior atrium walls, the base layer 50 serves as the face layer which is exposed to the vertical shaft, building exterior or atrium. The clip full flange 24 or 124 may be left exposed to view or covered with a subsequent layer of gypsum board, for example. For area separation walls, which may be load-bearing or non-load-bearing partition walls, both the base layer 50 and the secondary layer 80 may serve as face layers.

Furthermore, the stud spacing portion 62 defines an interior region R between the base layer 52 and the secondary layer 80. The clip 10, 90, 100 or 110 of the present invention advantageously allows for the substitution of stud member 60 having spacing portions 62 of varying lengths. In this manner, the clip 10 may be used to form shaftwalls having a variety of depths of the interior region R defined by the stud 60 selected. The interior region R of the multilayer wall 50 may advantageously be used to house fire hose plumbing, which typically requires a six inch space between the inner and outer walls 52, 80. Additionally, the gauges of the clip 10, 90, 100 or 110 and the stud 60 may be varied to provide walls 50 having varying strengths. For example, using the same gauge clips, heavier gauge studs 60 may be used to construct load-bearing walls than the studs used to construct non-load-bearing walls. This provides a significant advantage over the known single-piece wall framing clip systems where separate special parts must be ordered for each of these varying applications.

At a typical building site, a variety of multilayer walls may be used having varying interwall spacings. The clip 10, 90, 100 or 110 may be ordered for all walls, regardless of the interwall spacing. The C-shaped studs 60 are standard, readily available parts which may be obtained from a variety of sources. Thus, the interchangeability of the clip and C-shaped stud 60 advantageously provides for greater simplicity in ordering building materials and can shorten lead times in ordering additional wall spacing assemblies, such as assembly 58.

Furthermore, the clip 10, 90, 100 or 110 and stud 60 forming a wall spacing assembly, such as assembly 58, advantageously provides for a stronger multilayer wall and allows for variety in assembling the base layer 50 and the secondary layer 80. For example, in a building having a lobby with a relatively high ceiling, the lower backing or secondary panels may be of an expensive glamorous material, such as marble (not shown). Heavier gauge studs 60 which resist flexing may be used to assemble the lobby floor marble layer. The panels above the marble panels may be less expensive panels, such as drywall panels. The upper level drywall panels are also lighter in weight, and the upper level wall sections may be assembled using lighter gauge studs, with all levels using the same gauge clip, if desired.

The use of clip 10, 90, 100 or 110 and stud 60 to form a wall spacing assembly, such as assembly 58, provides a multilayer wall 50 which may flex when subjected to changing pressure. Such pressure changes may be caused by the movement of an elevator within an elevator shaft surrounded by wall 50. Some high speed elevators run at speeds up to thirty feet per second. For an elevator car traveling upward, the portion of the shaft above the car is pressurized, and the portion of the shaft below the car is under a vacuum. The flexible wall 50 provided by the present invention readily accommodates these changing pressures within an elevator shaft. Additionally, the multilayer wall 50 of the present invention may flex to remain intact wall during certain earthquake tremors. The multilayer wall 50 is well suited for use as a curtain wall on a building exterior which must withstand significant wind loads. The flexible nature of wall 50 provides a distinct advantage over the previously used masonry walls in such applications, as masonry walls often fracture and crack under these loading conditions.

The clip 10, 90, 100 or 110 of the present invention being separate from the stud 60 decouples the multilayer wall 50 to retard the transmission of sound and to decrease the thermal conductance through the wall. This is particularly advantageous for area separation walls, and for party walls which divide compartments for different occupancies and often have sound and fire requirements.

Although the clip 10, 90, 100 or 110 and wall spacing assembly 58 of the present invention are illustrated for forming a multilayer wall assembly, such as wall 50, it is apparent that the clip and assembly methods described herein may be used to construct a multilayer ceiling assembly (not shown).

Having illustrated and described the principles of my invention with respect to several preferred embodiments, it should be apparent to those skilled in the art that my invention may be modified in arrangement and detail without departing from such principles. For example, other stud members may be used, such as those having a J-shape, or a Z-shape, as long as some form of lip 68 is provided for engagement by the clip 10. Of course, other types of hook members may be provided which may engage studs in a manner other than with a lip 68. Furthermore, it is apparent that the stud lip 68 need not be elongate, but may be segmented to comprise a plurality of substantially co-planar lip members for engagement by the clip. Similarly, other suitable material substitutions, such as using various types of plastics for the clip and stud may be implemented, as well as dimensional variations for the components for the clip, stud and wall. I claim all such modifications falling within the scope and spirit of the following claims.

I claim:

1. An elongate unitary wall framing clip for forming a multilayer wall assembly, the wall framing clip comprising:
    an elongate web portion having proximate and distal edges and first and second side surfaces;
    an elongate full flange portion joining the distal edge of the web portion and extending from each of the first and second side surfaces of the web portion;
    an elongate half flange portion joining the proximate edge of the web portion and extending perpendicularly from the first side surface of the web portion, with the first side surface and the half flange portions extending therefrom cooperating to from a first channel for receiving an edge of a first backing panel; and
    a lip engaging portion joining the half flange portion at an acute angle and extending over a surface of the half flange portion opposite the first channel.

2. A wall framing clip according to claim 1 wherein the wall framing clip is formed from a single sheet of material with multiple folds forming several portions of the clip including the web portion, the half flange portion, and the full flange portion.

3. A wall framing clip according to claim 2 wherein the full flange portion has a partial double layer formed by the single sheet of material being folded over on itself.

4. A wall framing clip according to claim 1 wherein the lip engaging portion comprises an elongate crimped edge portion.

5. A wall framing clip according to claim 1 wherein the lip engaging portion is a resilient member for flexing relative to the half flange portion.

6. An elongate unitary wall framing clip for forming a multilayer wall assembly, the wall framing clip comprising:
    an elongate web potion having proximate and distal edges and first and second side surfaces;
    an elongate full flange portion joining the distal edge of the web portion and extending from each of the first and second side surfaces of the web portion;
    an elongate half flange portion joining the proximate edge of the web portion, with the first side surface and the half and full flange portions extending therefrom cooperating to form a first channel; and
    a lip engaging portion joining the half flange portion extending over the half flange portion;
    the lip engaging portion comprising a plurality of cut-out hook members on he half flange portion, with each cut-out hook member comprising a cut-out section of the half flange portion bent outwardly with respect to the web portion and terminating at a crimped edge.

7. An elongate unitary wall framing clip for forming a multilayer wall assembly, the wall framing clip comprising:
    an elongate web portion having proximate and distal edges and first and second side surfaces;
    an elongate full flange portion joining the distal edge of the web portion and extending from each of the first and second side surfaces of the web portion;
    an elongate half flange portion joining the proximate edge of the web portion and extending substantially perpendicularly from the first side surface of the web portion, with the first side surface and the half and full flange portions extending therefrom cooperating to form a first channel for receiving an edge of a first backing panel; and
    a lip engaging portion joining the half flange portion at an acute angle and extending over a surface of the half flange portion opposite the first channel, wherein the lip engaging portion comprises plural lip engaging hook members each extending partially over and outwardly from the half flange portion.

8. A method of constructing a multilayer wall assembly having a base layer spaced apart from a secondary layer, comprising the steps of:
    (a) providing a plurality of backing panels, a plurality of secondary panels, and a plurality of stud members having a spacing portion terminating at opposing edges with base and secondary layer engaging portions, with the base layer engaging portion having a lip projecting generally toward the secondary layer engaging portion;
    (b) providing a plurality of wall framing clips, with each clip comprising an elongate unitary member including:
        (1) an elongate web portion having proximate and distal edges and first and second side surfaces;
        (2) an elongate full flange portion joining the distal edge of the web portion and extending from each of the first and second side surfaces of the web portion;
        (3) an elongate half flange portion joining the proximate edge of the web portion and extending from the first side surface of the web portion, with web portion first side surface and the half and full flange portions extending therefrom cooperating to form a first channel for receiving an edge of a first backing panel; and
        (4) a lip engaging portion joining the half flange portion to grip the lip of a stud member with the base layer engaging portion of the stud member cooperating with the clip web portion second side surface and the full flange portion extending therefrom to form a second channel for receiving an edge of a second backing panel;
    (c) first assembling the base layer by inserting an edge of a first backing panel into the first channel of a clip and by inserting an edge of a second backing panel into at least a portion of the second channel of said clip;
    (d) engaging a stud member lip with a clip lip engaging portion;
    (e) after assembling at least a portion of the base layer, next assembling the secondary layer by attaching first and second secondary panels to the secondary layer engaging portion of said stud member;
    (f) repeating said first assembling step until the base layer is completed; and
    (g) repeating said next assembling step until the secondary layer is completed.

9. A method of constructing a multilayer wall assembly according to claim 8 wherein the engaging step is performed before the first assembling step.

10. A method of constructing a multilayer wall assembly according to claim 8 wherein the engaging step is performed between the first assembling step and said next assembling step.

11. An elongate unitary wall framing clip, comprising:
    a single sheet of material with multiple folds having:
        a first flange portion having a first double layer portion formed by being folded over on itself;

a central web portion extending from the first double layer portion and terminating at a second flange portion, the first double layer portion of the first flange portion, the web portion and the second flange portion forming an elongate channel to receive an edge of a wall panel;

a hook portion extending from the second flange portion which is adapted to engage a lip portion of a stud member, the hook portion comprising plural lip engaging hook members each extending partially over and outwardly from the second flange portion.

12. A wall framing clip according to claim 11 wherein each hook member tapers from the second flange to a hook edge.

13. An elongate unitary wall framing clip comprising:
a single sheet of material with multiple folds having;
a first flange portion having a first double layer portion formed by being folded over on itself;
a central web portion extending from the first double layer portion and terminating at a second flange portion, the first double layer portion of the first flange portion, the web portion and the second flange portion forming an elongate channel to receive an edge of a wall panel;
a hook portion extending from the second flange portion which is adapted to engage a lip portion of a stud member, the hook portion comprising a plurality of cut-out hook members on the half flange portion, with each cut-out hook member comprising a cut-out section of the half flange portion bent outwardly with respect to the web portion and terminating at a crimped edge.

14. A wall framing clip according to claim 13 wherein each cut-out section is substantially rectangular in shape.

15. A fire resistant shaftwall for use in an vertical shaft, comprising:
a plurality of studs having a first side and opposite second side;
a base layer comprising plural gypsum backing panels each having a side edge, and an elongate single-piece wall framing clip for retaining two adjacent gypsum backing panels against one of the studs, the clip being removably attachable to the stud;
each stud being engaged at the first side thereof by the clip; and
a secondary layer comprising gypsum secondary panels, with the secondary panels being attached to the second side of the stud with the stud spacing apart the base and secondary layers, whereby the shaftwall may be assembled solely from the secondary layer side of the shaftwall exterior to he vertical shaft by first assembling the base layer;
wherein the wall framing clip comprises an elongate clip formed from a single sheet of material having multiple folds, including;
(1) a full flange portion having a first partial double layer portion formed by being folded over on itself;
(2) a half flange portion;
(3) a central web portion having first and second side surfaces, the web portion interconnecting the full and half flange portions with the half flange potion extending from the web portion first side surface, and the full flange portion extending from each of the first and second side surfaces of the web portion; and (4) a grip portion for resiliently engaging an edge of a C-shaped stud, whereby the half flange portion, the web portion first side surface and the full flange portion extending outwardly therefrom serve as a first channel to receive a first gypsum backing panel, and whereby a portion of the C-shaped channel, the web portion second side surface and the full flange portion extending outwardly therefrom serve as a second channel to receive a second gypsum backing panel, such that the first and second gypsum backing panels serve as the adjacent gypsum backing panels.

16. A fire resistant shaftwall according to claim 15 wherein the grip means comprises an elongate crimped edge portion.

17. A fire resistant shaftwall according to claim 15 wherein the grip means comprises the half flange having a plurality of cutout sections, with each cutout section bent outwardly with respect to the web portion and terminating at a crimped edge.

18. A wall spacing assembly for spacing apart a base layer and a secondary layer of multilayer wall assembly, with the base layer comprising plural backing panels and the secondary layer comprising plural secondary panels, the wall spacing assembly comprising:
(a) a stud member having a secondary layer engaging portion and a base layer engaging portion with a lip projecting generally toward the secondary layer engaging portion; and
(b) an elongate unitary wall framing clip including:
(1) an elongate web portion having proximate and distal edges and first and second side surfaces;
(2) an elongate full flange portion joining the distal edge of the web portion and extending from each of the first and second side surfaces of the web portion;
(3) an elongate half flange portion joining the proximate edge of the web portion and extending from the first side surface of the web portion, with web portion first side surface and the half and full flange portions extending therefrom cooperating to form a first channel for receiving an edge of a first backing panel of the base layer; and
(4) a lip engaging portion joining the half flange portion at an acute angle extending over the half flange portion and detachably gripping the lip of the stud member with the base layer engaging portion of the stud member cooperating with the web portion second side surface and the full flange portion extending therefrom to form a second channel for receiving an edge of a second backing panel of the base layer, with the stud member secondary layer engaging portion extending outwardly from the base layer for attaching first and second secondary panels of the secondary layer thereto.

19. A wall spacing assembly for spacing apart a base layer and a secondary layer of a multilayer wall assembly, with the base layer comprising plural backing panels and the secondary layer comprising plural secondary panels, the wall spacing assembly comprising:
(a) a stud member having a secondary layer engaging portion and a base layer engaging portion with a lip projecting generally toward the secondary layer engaging portion, wherein the stud member comprises a C-shaped stud; and
(b) an elongate unitary wall framing clip including:

(1) an elongate web portion having proximate and distal edges and first and second side surfaces;

(2) an elongate full flange portion joining the distal edge of the web portion and extending from each of the first and second side surfaces of the web portion;

(3) an elongate half flange portion joining the proximate edge o the web portion and extending from the first side surface of the web portion, with web portion first side surface and the half and full flange portions extending therefrom cooperating to form a first channel for receiving an edge of a first backing panel of the base layer; and (4) a lip engaging portion joining the half flange portion and detachably gripping the lip of the stud member with the base layer engaging portion of the stud member cooperating with the web portion second side surface and the full flange portion extending therefrom to form a second channel for receiving an edge of a second backing panel of the base layer, with the stud member secondary layer engaging portion extending outwardly from the base layer for attaching first and second secondary panels of the secondary layer thereto;

the wall framing clip being formed from a single sheet of material with multiple folds forming the web portion and the half and full flange portions.

20. A wall framing clip for retaining a pair of adjacent wall panels against an elongate stud having an elongate stud edge thereon, the clip comprising:

an elongate web portion having proximate and distal edges and opposed, substantially planar first and second side surfaces;

a first substantially planar flange portion joined to the distal edge and extending substantially perpendicularly from the web portion in opposite directions;

a second substantially planar flange portion joined to the proximate edge and extending substantially perpendicularly from the web portion in at least one direction; and an elongate lip engaging portion joined to the second flange portion at an acute angle extending over the half flange portion for removably gripping at least a portion of the elongate stud edge and for removably fastening the clip to the stud, whereby the clip when fastened to the stud, cooperates with the stud to define opposing channels for receiving and retaining respective wall panel edges of the pair of adjacent wall panels.

21. A clip according to claim 20 wherein the clip has a substantially J-shaped cross section.

22. A clip according to claim 20 wherein the clip is formed from a single sheet of metal which is bent to form the web portion, the first and second flange portions, and the lip engaging portion.

23. A clip according to claim 22 wherein the first flange portion includes a double fold portion for at least a portion of its length.

24. A wall framing clip for retaining a pair of adjacent wall panels against an elongate stud having an elongate stud edge thereon, the clip comprising:

an elongate web portion having proximate and distal edges and opposed, substantially planar first and second side surfaces;

a first substantially planar flange portion joined to the distal edge and extending substantially perpendicularly from the web portion in opposite directions;

a second substantially planar flange portion joined to the proximate edge and extending substantially perpendicularly from the web portion in at least one direction; and an elongate lip engaging portion joined to the second flange portion and adapted to removably grip at least a portion of the elongate stud edge and thereby removably fasten the clip to the stud, the lip engaging portion being bent backwardly relative to second flange portion so as to define an acute angle therebetween, the lip engaging portion having a crimped edge portion extending generally toward the second flange portion, whereby the clip when fastened to the stud, cooperates with the stud to define opposing channels adapted to receive and retain respective wall panel edges of the adjacent wall panels.

* * * * *

UNITED STATES PATENT AND TRADEMARK OFFICE
CERTIFICATE OF CORRECTION

PATENT NO. : 5,245,811
DATED : September 21, 1993
INVENTOR(S) : WILLIAM L. KNORR It is certified that error appears in the above-identified patent and that said Letters Patent is hereby corrected as shown below:

Column 11, line 12, after "half" insert --and full--.
Column 11, line 13, "from" should be --form--.
Column 11, line 43, after the word "portion" insert --and extending from the first side surface of the web portion,--.
Column 11, line 49, "he" should be --the--.
Column 13, line 17, ";" should be --:--.
Column 13, line 53, "he" should be --the--.
Column 13, line 57, ";" should be --:--.
Column 13, line 65, April 30, 1993, page 2, line 13), "potion" should be --portion--.

Signed and Sealed this

Twenty-eighth Day of June, 1994

Attest:

BRUCE LEHMAN

Attesting Officer     Commissioner of Patents and Trademarks